US007661356B2

(12) United States Patent
Lin

(10) Patent No.: US 7,661,356 B2
(45) Date of Patent: Feb. 16, 2010

(54) FOOD-CUTTING DEVICE

(75) Inventor: Yu-Yuan Lin, Tainan (TW)

(73) Assignee: UNI-Splendor Corp., Tainan (TW)

( * ) Notice: Subject to any disclaimer, the term of this patent is extended or adjusted under 35 U.S.C. 154(b) by 510 days.

(21) Appl. No.: 11/549,321

(22) Filed: Oct. 13, 2006

(65) Prior Publication Data

US 2008/0087151 A1 Apr. 17, 2008

(51) Int. Cl.
*A23N 4/04* (2006.01)

(52) U.S. Cl. ........................................................ 99/537

(58) Field of Classification Search ................... 99/537, 99/485–643, 331, 385
See application file for complete search history.

(56) References Cited

U.S. PATENT DOCUMENTS 2,640,905 A * 6/1953 Evans ......................... 219/525
5,138,938 A * 8/1992 McClean ..................... 99/331

* cited by examiner

*Primary Examiner*—Daniel L Robinson
(74) *Attorney, Agent, or Firm*—Alan Kamrath; Kamrath & Associates PA

(57) ABSTRACT

A food-cutting device includes an upper metal base and a lower metal base respectively formed with recessed areas and shaped mold cavities with a predetermined cavity depth having raised rims outwardly projecting from the recessed areas and having inclined and closed peripheral patterns formed on inner surfaces. Cutters having a height greater than that of the raised rim are provided around the shaped mold cavities of the upper metal base. Moreover, press members respectively have one ends connected to each side of the upper metal base and the other ends connected to each side portion of a handle pivotally connected to a rear sick of the upper metal base. When the upper and lower metal bases are in a closed state to heat foodstuff, the foodstuff is pressed into a predetermined configuration, and a filling is encapsulated within the foodstuff followed by cutting the foodstuff by the cutters.

8 Claims, 7 Drawing Sheets

FOOD-CUTTING DEVICE

FIELD OF THE INVENTION

The present invention relates to a food-cutting device and, more particularly, to a food-cutting device having an upper metal base and a lower metal base, each of which is provided with at least one heater and at least one shaped mold cavity, wherein at least one cutter is formed around the shaped mold cavity so that when the upper and lower metal bases are closed, the cutter cuts a foodstuff and encapsulates the filling therein.

BACKGROUND OF THE INVENTION

Traditionally, when preparing sandwiches or bread with some filling, toast or bread must first be pre-heated and softened, and the filling must be prepared and heated at the same time. Then, when combining the toast or bread with the filling, the filling (such as ham, meat floss, hamburger, tuna, tomato, romaine lettuce, cheese, butter, red bean paste, and etc.) will be sandwiched between two slices of toast or stuffed into bread. However, for daily life, it is not easy to efficiently prepare and pre-heat the filling and the toast or the bread separately.

To solve the problems as described above, manufacturers have developed a metal base device with heaters, also called a sandwich toaster, for efficiently, easily, and simply preparing delicious sandwiches by heating a foodstuff in only one step. As shown in FIG. 1, a metal base device of a conventional sandwich toaster comprises an upper base 100 and a lower base 200 symmetrically corresponding to the upper base 100 and pivotally connected thereto. The upper base 100 is formed with two triangular-shaped mold cavities 101 while the lower base 200 is also formed with two triangular-shaped mold cavities 201 corresponding to the mold cavities 101. A slice of square toast is firstly put in the lower base 200, and, then, some filling is put onto the toast. After this, another slice of toast is put to cover the filling. Then, the upper base 100 is closed to the lower base 200 followed by heating. After heating, the heated foodstuff (i.e. the combination of the toast and the filling) is taken out of the sandwich toaster and is cut along a diagonal line of the heated foodstuff to finish preparation of the delicious sandwich without too much pre-heating processing.

However, the conventional sandwich toaster can only be used to heat foodstuffs and cannot be used to cut the foodstuffs after heating. It is therefore inconvenient. Furthermore, when the foodstuffs are manually cut after being taken out of the conventional sandwich toaster, the filling within the foodstuffs may leak from the side edges, or the cut edges of the foodstuffs may be uneven.

Therefore, the present invention provides a food-cutting device to solve the problems existing in conventional sandwich toasters as described above, wherein the food-cutting device is used to simultaneously heat toast or bread with a filling in two metal bases for retaining the original flavor of the filling within the toast or the bread while providing at least one cutter to cut the toast or the bread to precisely cut foodstuffs and to completely encapsulate the filling.

SUMMARY OF THE INVENTION

A primary object of the present invention is to provide a food-cutting device having an upper metal base and a lower metal base, each of which is formed with at least one recessed area therein, at least one shaped mold cavity having a raised rim outwardly projecting from the at least one recessed area with a predetermined cavity depth, and at least one inclined and closed peripheral pattern formed on an inner surface of the raised rim of the at least one shaped mold cavity. At least one cutter is further provided around the at least one shaped mold cavity of the upper metal base or the lower metal base and having a height greater than that of the raised rim of the at least one shaped mold cavity thereof. The food-cutting device further includes a pair of press members respectively having one end connected to each side of the upper metal base and the other end connected to each side portion of a handle which further has two pivotal portions pivotally connected to a rear side of the upper metal base. When the upper and lower metal bases are closed to heat some foodstuffs, the foodstuffs are pressed into a predetermined configuration, the fillings are completely encapsulated within the outer food layers, and the foodstuffs can be precisely cut by the cutter.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
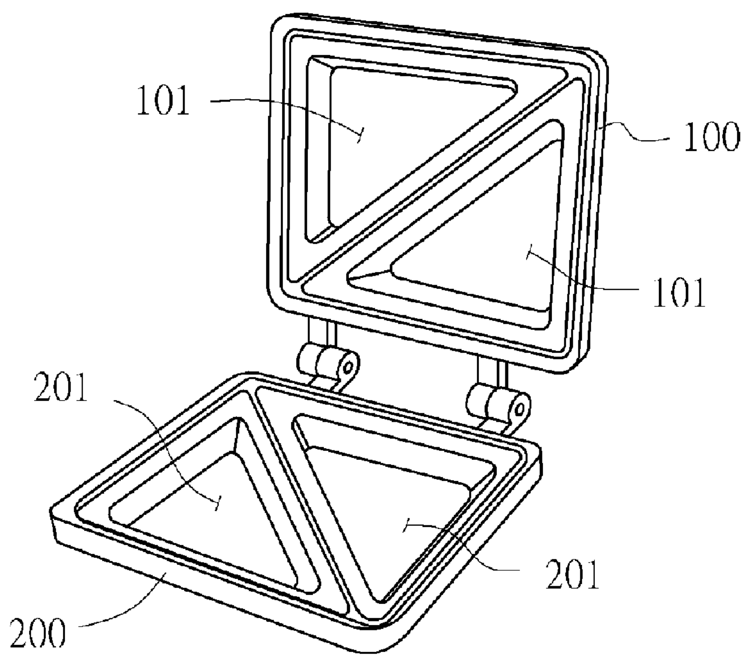
FIG. 1 (Prior Art)
FIG. 1 is an assembled perspective view of two metal bases of a conventional sandwich toaster.
Figure 2:
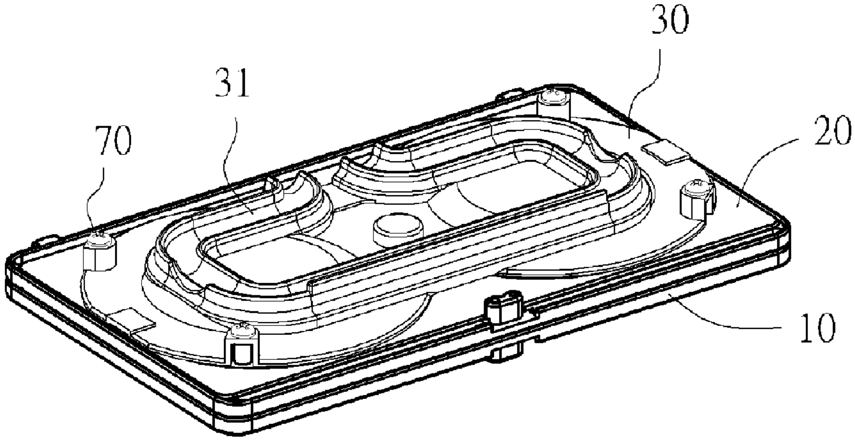
FIG. 2 is an assembled perspective view of two metal bases of a food-cutting device in a closed state according to a preferred embodiment of the present invention.
Figure 3:
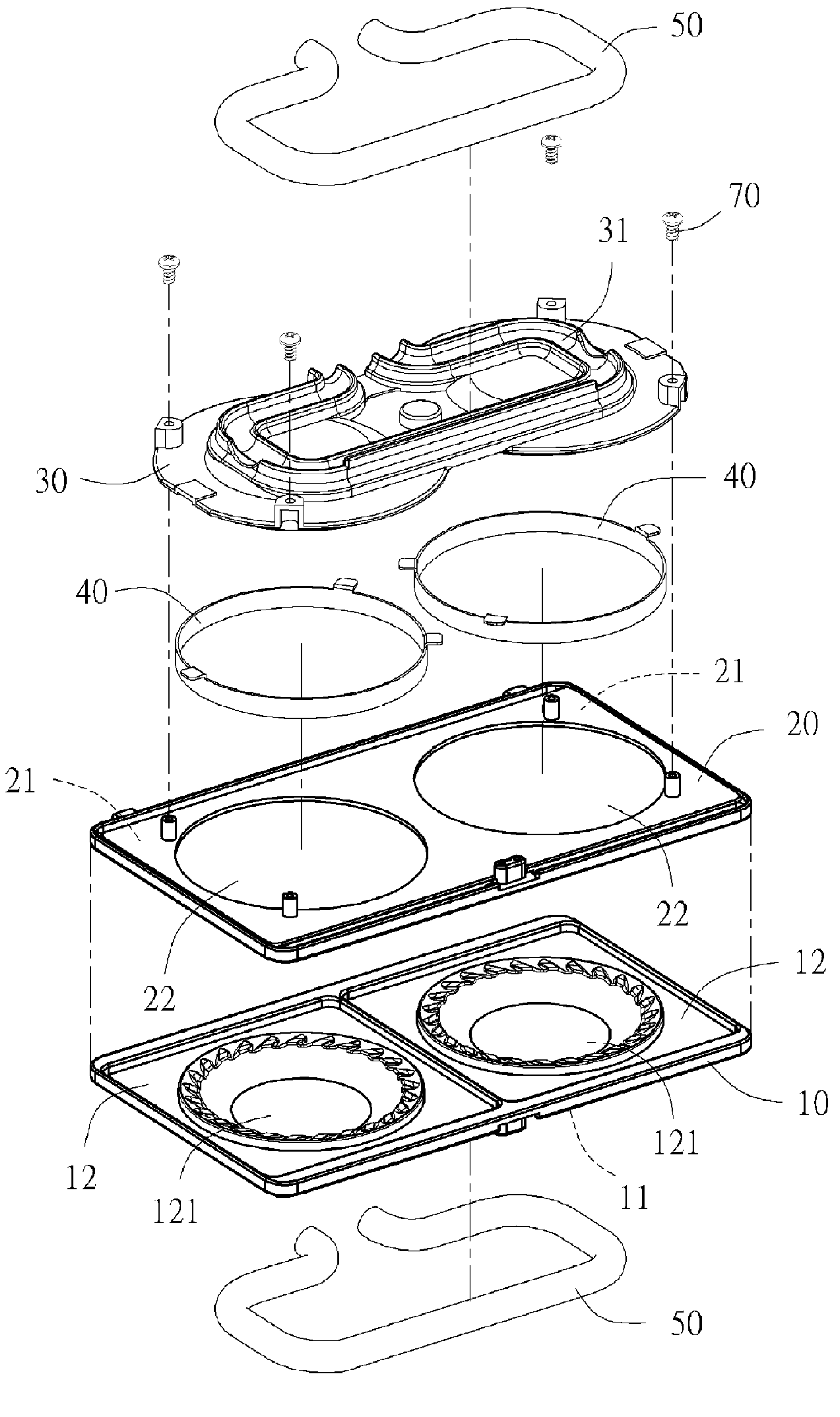
FIG. 3 is an exploded perspective view of the two metal bases of the food-cutting device according to the preferred embodiment of the present invention.
Figure 4:
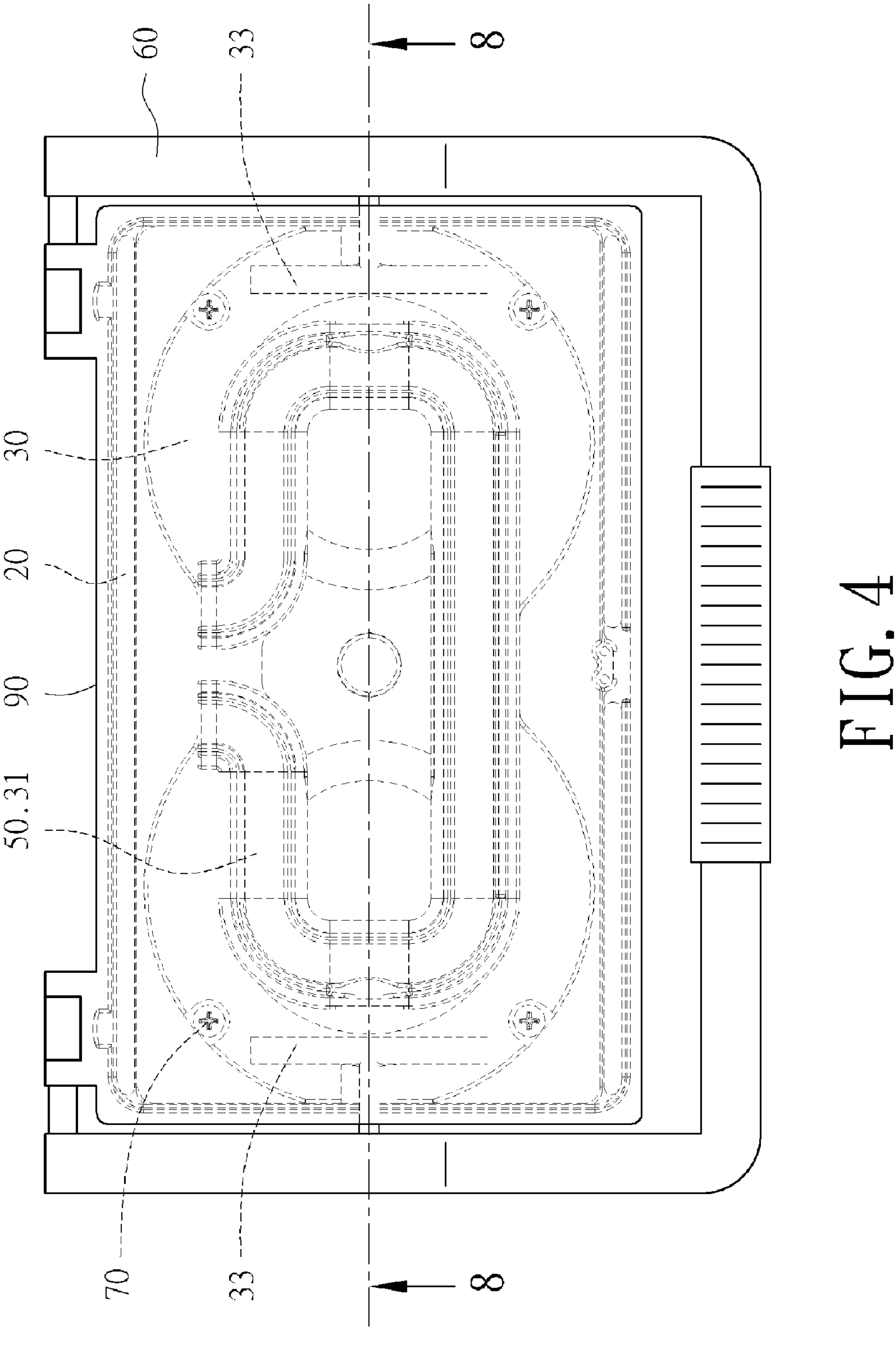
FIG. 4 is a top view of the two metal bases of the food-cutting device in the closed state according to the preferred embodiment of the present invention.
Figure 5:
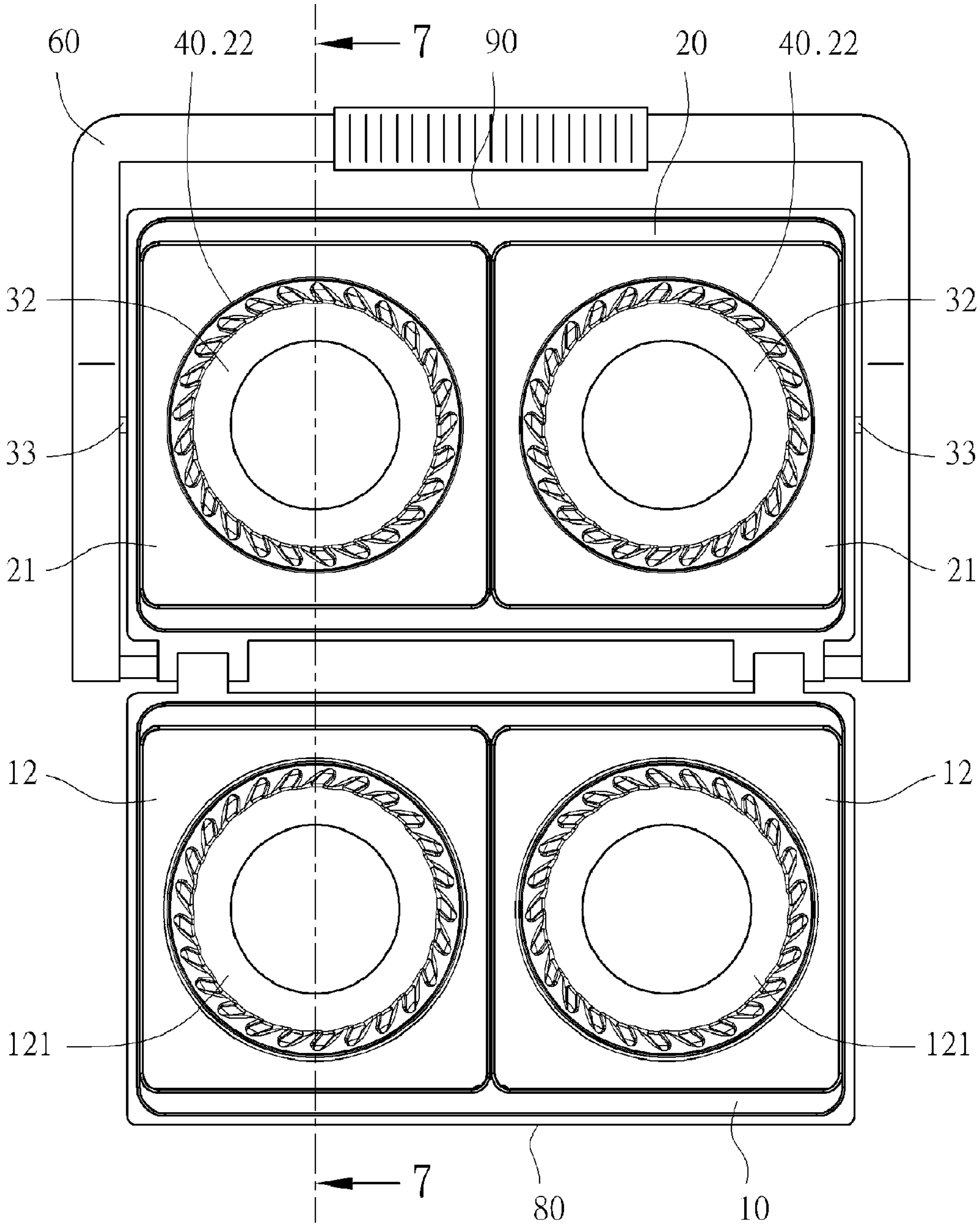
FIG. 5 is a top view of the two metal bases of the food-cutting device in an open state according to the preferred embodiment of the present invention.
Figure 6:
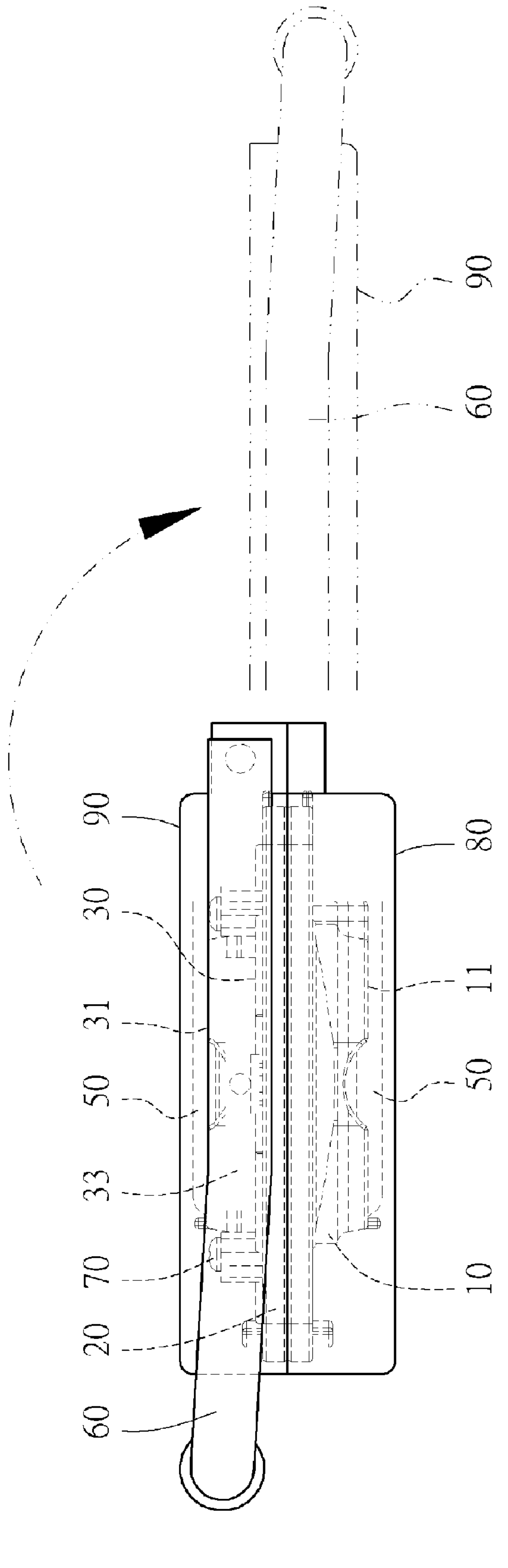
FIG. 6 is a side view of the two metal bases of the food-cutting device in the closed state according to the preferred embodiment of the present invention.
Figure 7:
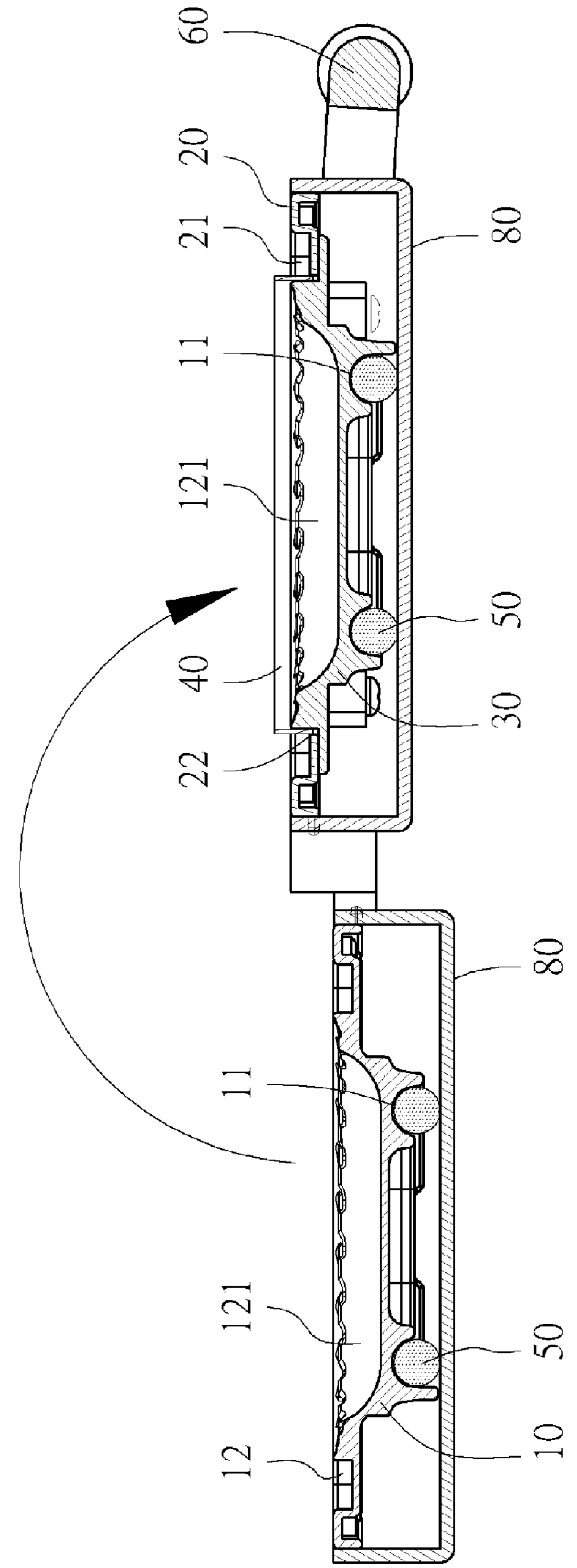
FIG. 7 is a cross-sectional view taken along line 7-7 of FIG. 5.

Referring now to FIGS. 2, 3, and 4, a food-cutting device according to a preferred embodiment of the present invention is illustrated. As shown, the food-cutting device comprises a lower base 10, a frame portion 20, a base portion 30, cutters 40, electric heaters 50, and a handle 60. The frame portion 20 and the base portion 30 constitute an upper base, and the cutters 40 can be selectively mounted on the lower base 10 or the upper base.

Referring back to FIGS. 2, 3, and 4, the lower base 10 of the preferred embodiment of the present invention has an outer side formed with a positioning groove 11 for receiving the electric heater 50 and an inner side formed with a pair of recessed areas 12. Each of the recessed areas 12 has a shaped mold cavity 121 having a raised rim outwardly projecting from the mold cavity 121. An inner surface of the raised rim of each of the mold cavities 121 is formed with an inclined and closed peripheral pattern (unlabeled). Furthermore, the lower base 10 is covered by a lower housing 80 made of plastic.

Referring still to FIGS. 2, 3, and 4, the frame portion 20 of the upper base of the preferred embodiment of the present invention has an inner side formed with a pair of recessed areas 21 and an outer side. A pair of through holes 22 communicate the inner side with the outer side of the frame portion 20. Each of the cutters 40 shaped in a close configuration to the raised rim is mounted on each of the through holes 22. Furthermore, the base portion 30 is formed with a pair of shaped mold cavities 32 each having a raised rim outwardly projecting therefrom. It should be noted that each of the cutter 40 has a height greater than that of the raised rim of each of the mold cavities 32 of the base portion 30.

Referring to FIGS. 2, 3, and 4, the base portion 30 of the upper base of the preferred embodiment of the present invention is mounted on and secured to the frame portion 20 by a plurality of screw members 70 so as to constitute a main body of the upper base. The base portion 30 has an outer side formed with a positioning groove 31 for receiving the electric heater 50. An inner surface of the raised rim of each of the mold cavities 32 of the base portion 30 is formed with an inclined and closed peripheral pattern (unlabeled). Moreover, both sides of the base portion 30 are respectively combined with one of the ends of a pair of T-shaped press members 33. Furthermore, the frame portion 20 is covered by an upper housing 90 made of plastic. After this, the other one of the ends of the pair of T-shaped press members 33 extend through and out of the upper housing 90 and are connected to two side portions of the handle 60. The handle 60 is further pivotally connected to a rear side of the frame portion 20. It should be noted that an upraised front portion of the handle 60 is bent upward in relation to the other portion of the handle 60.

Figure 8:
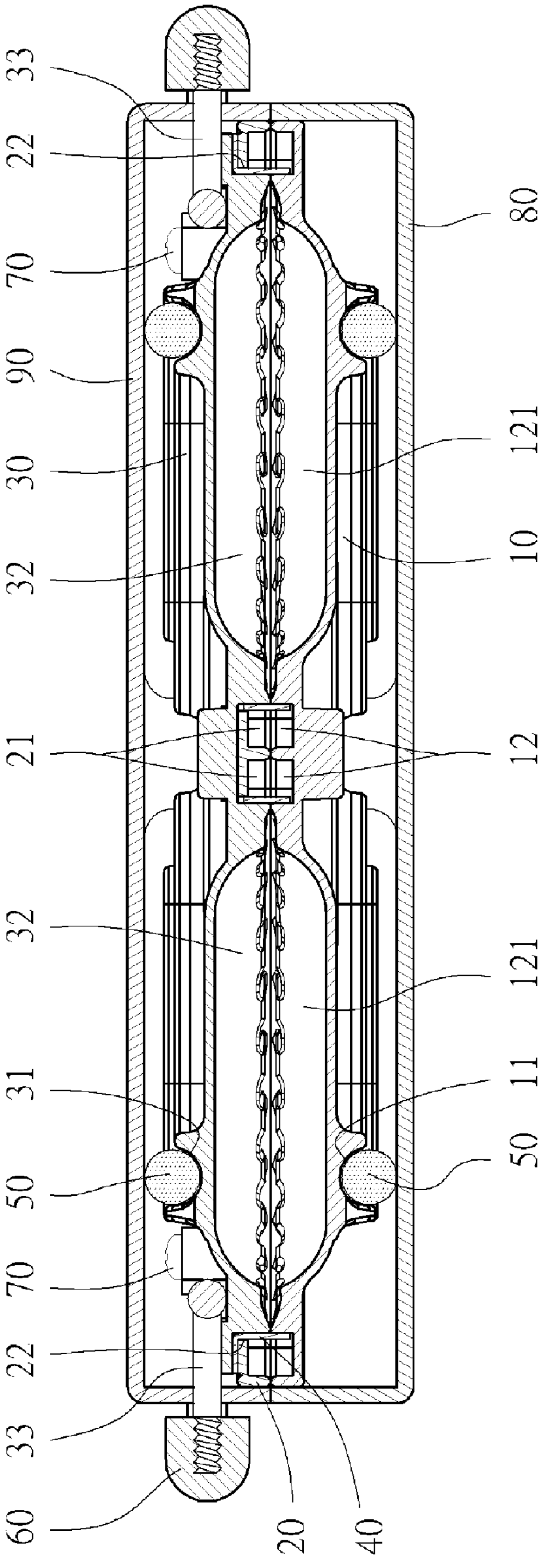
FIG. 8 is a cross-sectional view taken along line 8-8 of FIG. 4.

Referring now to FIGS. 5, 6, 7, and 8, when using the food-culling device, the upper base (i.e. the combination of the frame portion 20 and the base portion 30) is lifted by lifting the handle 60 until the upper base is in an open state in relation to the lower base 10. Then, a slice of toast or bread is put in the lower base 10 followed by puffing a filling on top. Then, the upper base combined by the frame portion 20 and the base portion 30 are lowered by lowering the handle 60 until it mates with the lower base 10, as shown in FIG. 8. As a result, the raised rims of the mold cavities 121 of the lower base 10 are in contact with the raised rims of the mold cavities 32 of the base portion 30. The upraised front portion of the handle 60 can be pressed downward with exertion to actuate the press members 33 of the base portion 30 so that the foodstuff (i.e. the toast or the bread with the filling) is pressed into a predetermined configuration by the mold cavities 121 and 32 of the lower base 10 and the base portion 30. Meanwhile, the inclined and closed peripheral patterns are designed to retain the filling within the toast or the bread. Particularly, when the upper base combined by the frame portion 20 and the base portion 30 is closed on the lower base 10, the cutter 40 mounted on the base portion 30 can precisely cut and encapsulate the foodstuff.

As described above, the frame portion 20, the base portion 30, and the cutters 40 of the present invention are separately pre-fabricated, and then combined together to constitute the upper base. Alternatively, the frame portion 20, the base portion 30, and the cutters 40 of the present invention can be selectively integrally formed. Furthermore, in the preferred embodiment, the cutters 40 are mounted around the mold cavities 32 of the base portion 30 of the upper base. Alternatively, the cutters 40 can be selectively mounted around the mold cavities 121 of the lower base 10. Preferably, distal edges of the cutters 40 can be selected from sharp edges for facilitating cutting of the foodstuff.

The present invention has been described with a preferred embodiment thereof shown and it is understood that many changes and modifications to the shown embodiment can be carried out without departing from the scope and the spirit of the invention that is intended to be limited only by the appended claims.

What is claimed is:

1. A food-cutting device, comprising an upper metal base and a lower metal base, each of the upper and lower metal bases being formed with at least one shaped mold cavity and having at least one heater, wherein each of the lower and upper metal bases has an inner side formed with at least one recessed area, wherein the at least one shaped mold cavity with a predetermined cavity depth has a raised rim outwardly projecting from the at least one recessed area, wherein at least one inclined and closed peripheral pattern is formed on an inner surface of the raised rim of the one shaped mold cavity, wherein at least one cutter shaped in a close configuration to the raised rim is provided around the at least one shaped mold cavity of the upper metal base or the lower metal base, and a handle is connected to a rear side of the upper metal base;

wherein when the upper and lower metal bases are in a closed state to heat a foodstuff, the foodstuff is pressed into a predetermined configuration, a filling is encapsulated within the food, and the foodstuff is cut by the at least one cutter.

2. The food-cutting device as claimed in claim 1, wherein said at least one cutter is integrally formed with the upper metal base or the lower metal base.

3. The food-cutting device of claim 1, wherein said upper metal base further comprises a frame portion, a base portion, and the at least one cutter, separately pre-fabricated and combined together.

4. The food-cutting device of claim 1, wherein said at least one cutter has a height greater than that of the raised rim of the at least one shaped mold cavity.

5. The food-cutting device of claim 1, wherein said handle is formed with an upraised front portion for facilitating pressing the upper metal base.

6. The food-cutting device of claim 1, wherein said upper metal base is connected to one end of each of a pair of press members, and another end of each of the pair of press members is connected to side portions of the handle, with the side portions of the handle connected to the rear side of the upper mold base spaced from the other end of each of the air of press members.

7. The food-cutting device of claim 1, wherein said at least one cutter has a sharp distal edge.

8. The food-cutting device of claim 6, wherein each of the pair of press members is T-shaped and has a head and a leg connected perpendicular to the head, with the leg including the one end and the other end, with the one end connected to the head, with the head extending parallel to the side portions of the handle.

* * * * *